US012756760B2

(12) United States Patent
Tsubotani

(10) Patent No.: US 12,756,760 B2
(45) Date of Patent: Oct. 6, 2026

(54) COMMUNICATION APPARATUS AND CONTROL METHOD

(71) Applicant: CANON KABUSHIKI KAISHA, Tokyo (JP)

(72) Inventor: Daiki Tsubotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 19/026,917

(22) Filed: Jan. 17, 2025

(65) Prior Publication Data

US 2025/0247452 A1 Jul. 31, 2025

(30) Foreign Application Priority Data

Jan. 25, 2024 (JP) ................................ 2024-009598

(51) Int. Cl.
*H04L 67/141* (2022.01)
*H04L 67/06* (2022.01)

(52) U.S. Cl.
CPC ............ *H04L 67/141* (2013.01); *H04L 67/06* (2013.01)

(58) Field of Classification Search
CPC .............................. H04L 67/06; H04L 67/141
See application file for complete search history.

(56) References Cited

U.S. PATENT DOCUMENTS

2013/0054818 A1* 2/2013 Furuta .................. G06F 3/1236 709/227
2018/0241891 A1* 8/2018 Kawai ................ H04N 1/00228

FOREIGN PATENT DOCUMENTS

JP 7017419 B2 2/2022
KR 20160107008 A * 9/2016 ............ H04W 24/02

* cited by examiner

*Primary Examiner* — Kostas J Katsikis
(74) *Attorney, Agent, or Firm* — Venable LLP

(57) ABSTRACT

A communication apparatus includes a communication unit that is able to communicate with an external apparatus, and a control unit that performs connection processing for establishing a plurality of sessions with the external apparatus, and performs reconnection processing of a session that has failed to be connected. The communication apparatus sets a frequency of performing the reconnection processing in a case where there is a session that has failed to be connected among the plurality of sessions to be lower than a frequency of performing the reconnection processing in a case where there is no session that has successfully been connected among the plurality of sessions.

13 Claims, 5 Drawing Sheets

COMMUNICATION APPARATUS AND CONTROL METHOD

BACKGROUND OF THE INVENTION

Field of the Invention

The present invention relates to a technique of transferring data from a communication apparatus to an external apparatus.

Description of the Related Art

As data transfer methods of transferring data from a communication apparatus such as a digital camera to an external apparatus such as a server, there are known a File Transfer Protocol (FTP), Hyper Text Transfer Protocol (HTTP), Real-time Transport Protocol (RTP), and the like. In FTP, an external apparatus serves as an FTP server that transmits/receives a file to/from an FTP client in accordance with FTP, and a communication apparatus is connected as an FTP client to the FTP server so as to be capable of mutual communication.

In FTP, there is a requirement that it is possible to immediately transfer data via a network. Furthermore, in FTP, by establishing a plurality of sessions (control connection and data connection) between the FTP client and the FTP server, and performing data transfer using the plurality of sessions, it is possible to perform data transfer more efficiently than in a case where a single session is used.

Japanese Patent No. 7017419 describes a technique of performing data transfer using a plurality of sessions between a communication apparatus and an FTP server.

Japanese Patent No. 7017419 does not assume a case where a session fails to be established. If the communication apparatus fails to establish a session, it can perform reconnection processing with respect to the session that has failed to be connected. At the time of the reconnection processing, if the cause of the failure of the connection is eliminated, connection succeeds by the reconnection processing but if the cause of the failure of the connection is not eliminated, even if the reconnection processing is performed, connection repeatedly fails.

If a plurality of sessions are established between the communication apparatus and the server, one of the causes of the failure of connection may be that the server limits the number of sessions that can be connected simultaneously by the same user. In this case, unless the limitation by the server is changed, even if the reconnection processing is performed, connection repeatedly fails, thereby increasing unnecessary reconnection processing. Since the reconnection processing puts a processing load on each of the communication apparatus and the server, and it also uses a communication band between the communication apparatus and the FTP server, it is not efficient to perform unnecessary reconnection processing.

SUMMARY OF THE INVENTION

The present invention has been made in consideration of the aforementioned problems and realizes techniques of reducing unnecessary reconnection processing of a session that has failed to be connected.

In order to solve the aforementioned problems, the present invention provides a communication apparatus comprising: a communication unit that is able to communicate with an external apparatus; and a control unit that performs connection processing for establishing a plurality of sessions with the external apparatus, and performs reconnection processing of a session that has failed to be connected, wherein the control unit sets a frequency of performing the reconnection processing in a case where there is a session that has failed to be connected among the plurality of sessions to be lower than a frequency of performing the reconnection processing in a case where there is no session that has successfully been connected among the plurality of sessions.

In order to solve the aforementioned problems, the present invention provides a control method of a communication apparatus that is able to communicate with an external apparatus, comprising: performing connection processing for establishing a plurality of sessions with the external apparatus; and performing reconnection processing of a session that has failed to be connected, wherein a frequency of performing the reconnection processing in a case where there is a session that has failed to be connected among the plurality of sessions is set lower than a frequency of performing the reconnection processing in a case where there is no session that has successfully been connected among the plurality of sessions.

According to the present invention, it is possible to reduce unnecessary reconnection processing of a session that has failed to be connected.

Further features of the present invention will become apparent from the following description of exemplary embodiments (with reference to the attached drawings).

DESCRIPTION OF THE EMBODIMENTS

Figure 1A:
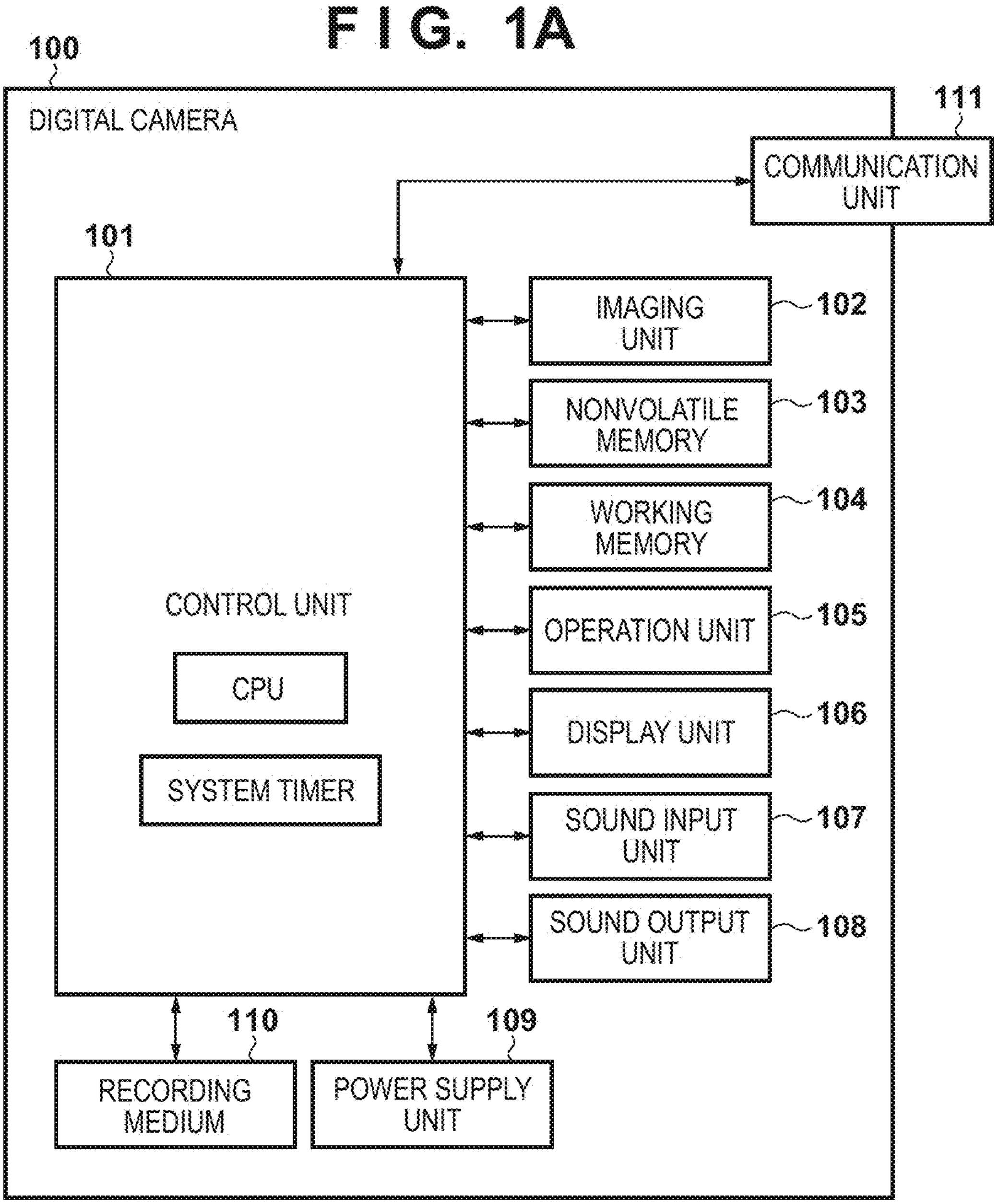
FIG. 1A is a block diagram illustrating a configuration of a digital camera according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An example of applying a communication apparatus of the present invention to an image capture apparatus such as a digital camera will be described below. Note that a present embodiment will describe an example of applying the communication apparatus of the present invention to a digital camera, but the present invention is not limited to this and can be applied to any apparatus having a communication function. For example, the present invention can be applied to a personal computer (desktop PC or notebook PC), a mobile device such as a tablet PC, a smartphone, a smartwatch, or smartglasses, or an information processing apparatus such as a Personal Digital Assistant (PDA) or a media player.

The digital camera according to the present embodiment can be connected to an external apparatus and can transfer data such as an image file to the external apparatus. The external apparatus of the present embodiment serves as an FTP server that transmits/receives a file to/from an FTP client in accordance with File Transfer Protocol (FTP). The digital camera according to the present embodiment is connected as an FTP client to the FTP server so as to be capable of mutual communication. Note that a communication protocol according to the present embodiment is not limited to FTP and may be File Transfer Protocol over SSL/TLS (FTPS), SSH File Transfer Protocol (SFTP), or the like.

First Embodiment

In the present embodiment, in a case where a plurality of sessions (control connection and data connection) are established between a digital camera and an FTP server, the frequency of performing reconnection processing with respect to a session that has failed to be connected is controlled to reduce unnecessary reconnection processing. The present embodiment will describe an example of controlling, as the frequency of performing reconnection processing, the number of times the reconnection processing is performed or the time during which the reconnection processing is repeatedly performed.

Configuration of Digital Camera 100

First, the configuration and function of a digital camera 100 according to the present embodiment will be described with reference to FIG. 1.

A control unit 101 is a Central Processing Unit (CPU) or an Accelerated Processing Unit (APU) that comprehensively controls the overall digital camera 100, and implements communication processing and control processing to be described later by executing programs stored in a nonvolatile memory 103 to be described later. Note that a plurality of hardware components may control the overall apparatus by sharing processing, instead of controlling the overall apparatus by the control unit 101.

The control unit 101 includes a system timer that measures the time used to perform various control operations or the time of an inner clock.

An imaging unit 102 includes a lens group including a zoom lens and a focus lens, and a shutter having an aperture function. Furthermore, the imaging unit 102 includes an image sensor formed by a CCD or CMOS element that converts an object image into an electrical signal, and an A/D converter that converts an analog image signal output from the image sensor into a digital signal. Under the control of the control unit 101, the imaging unit 102 converts object image light whose image is formed by the lenses included in the imaging unit 102 into an electrical signal by the image sensor, performs noise reduction processing or the like, and outputs image data formed by a digital signal.

The control unit 101 performs resize processing such as pixel interpolation and reduction or color conversion processing for the image data captured by the imaging unit 102. Furthermore, the control unit 101 performs compression coding using the JPEG format or the like for still image data that has undergone image processing, or it encodes moving image data by a moving image compression method such as MPEG2 or H.264, thereby generating an image file and storing it in a recording medium 110. In the digital camera 100 of the present embodiment, the image data is stored in the recording medium 110 in accordance with the Design Rule for Camera File system (DCF) standard. In addition, the control unit 101 performs predetermined arithmetic processing using captured image data, and controls the focus lens, the aperture, and the shutter of the imaging unit 102 based on the obtained arithmetic result, thereby performing auto-focus (AF) processing or auto-exposure (AE) processing. The nonvolatile memory 103 is an electrically erasable/recordable memory and, for example, an EEPROM or the like is used. The nonvolatile memory 103 stores constants, programs, and the like for the operation of the control unit 101. The programs are programs for executing control processing to be described later in the present embodiment.

A working memory 104 is used as a work area in which constants and variables for the operation of the control unit 101, and programs and the like read out from the nonvolatile memory 103 are deployed. In addition, the working memory 104 is used as a buffer memory that temporarily holds image data captured by the imaging unit 102 and sound data generated by a sound input unit 107 or an image display memory for a display unit 106.

Figure 1B:
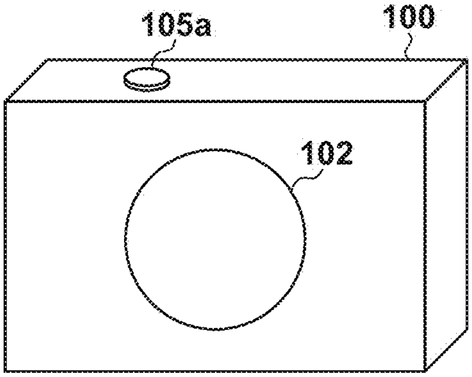
FIGS. 1B and 1C are external views each illustrating the configuration of the digital camera according to the first embodiment.
Figure 1C:
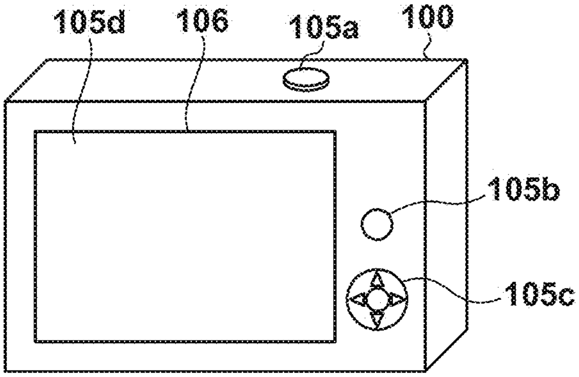

An operation unit 105 is formed by operation members such as various kinds of switches, buttons, and a touch panel that accept various kinds of operations from the user. As shown in FIGS. 1B and 1C, the operation unit 105 includes, for example, a shutter-release button 105*a* used to shoot an image, a reproduction button 105*b* used to reproduce a shot image, and a cross key 105*c* that is formed from up, down, left, and right buttons for making various settings of the camera. The operation unit 105 also includes a touch panel 105*d* formed integrally with the display unit 106 to be described later. Furthermore, the operation unit 105 includes an operation member such as a dedicated connection button used to start communication with an external apparatus via a communication unit 111 to be described later.

While the shutter-release button 105*a* is being operated, that is, pressed halfway (a shooting preparation instruction), it is turned on to generate a first shutter switch signal SW1. Upon receiving the first shutter switch signal SW1, the control unit 101 controls the imaging unit 102 to start an operation such as AF processing or AE processing. When the operation of the shutter-release button is completed, that is, the shutter-release button is pressed fully (a shooting instruction), the shutter-release button is turned on to generate a second shutter switch signal SW2. Upon receiving the second shutter switch signal SW2, the control unit 101 starts a series of operations of shooting processing from reading out image data from the imaging unit 102 to writing of an image file in the recording medium 110.

The display unit 106 displays a live view image, a shot image, characters for interactive operations, and the like. The display unit 106 is, for example, a display device such as a liquid crystal display or an organic EL display. The display unit 106 may be integrated with the digital camera 100 or may be an external apparatus connected to the digital camera 100. The digital camera 100 can be connected to the display unit 106, and it need only be able to control display of the display unit 106.

The sound input unit 107 includes one or a plurality of microphones incorporated in the digital camera 100 or connected to the digital camera 100 via a sound terminal, and converts an analog sound signal, which is generated by collecting sound around the digital camera 100, into a digital signal and outputs the digital signal to the control unit 101. The control unit 101 performs various kinds of sound processing on the digital sound signal generated by the sound input unit 107, thereby generating sound data. When a moving image is shot, the control unit 101 generates a moving image file with sound from sound data generated by the sound input unit 107 and image data generated by the imaging unit 102. When a still image is shot, the control unit 101 adds a sound file to an image file by associating sound data generated by the sound input unit 107 with image data generated by the imaging unit 102. Note that the processing of generating sound data by the sound input unit 107 may be executed by performing part of the processing by another hardware component (for example, the control unit 101).

A sound output unit 108 is a loudspeaker that converts sound data generated by the sound input unit 107, electronic sound data stored in the nonvolatile memory 103, or sound data associated with a moving image file into an analog sound signal and reproduces it as sound. The electronic sound is, for example, music, warning sound, focus sound, electronic shutter sound, or operation sound, and is stored as sound data in the nonvolatile memory 103. The user can notice, for example, a fact that an object is focused on, an error occurring in the digital camera 100, or the like by hearing the electronic sound output from the sound output unit 108.

A power supply unit 109 is controlled by the control unit 101 to be able to supply power to each component of the digital camera 100. The power supply unit 109 is a primary battery such as an alkaline battery or lithium battery, a secondary battery such as an NiCd battery, NiMH battery, or lithium ion battery, or the like.

A recording medium 110 records an image file and a sound file generated by the control unit 101. Furthermore, the control unit 101 reads out an image file and a sound file stored in the recording medium 110 in a reproduction mode. The recording medium 110 may be a memory card, a hard disk drive, or the like attached to the digital camera 100, or a flash memory or a hard disk drive incorporated in the digital camera 100. The digital camera 100 need only be able to access the recording medium 110.

A communication unit 111 includes a communication interface for wirelessly communicating with an external apparatus such as an FTP server 200 to be described later. The digital camera 100 according to the present embodiment can exchange data with the external apparatus via the communication unit 111, and it can transfer an image file and a sound file to the external apparatus via the communication unit 111. Note that in the present embodiment, the communication unit 111 includes an antenna and a communication circuit for communicating with the external apparatus by a wireless LAN complying with the IEEE 802.11 standard or a communication circuit for communicating with the external apparatus by a wired LAN complying with the Ethernet standard. The control unit 101 implements wireless communication with the external apparatus by controlling the communication unit 111. Note that the communication unit 111 need not always be incorporated in the digital camera 100, and the digital camera 100 can be connected to the incorporated or external communication unit 111 and need only have at least a function of controlling the communication unit 111.

Note that the communication apparatus according to the present embodiment is the digital camera 100 and thus includes the imaging unit 102 but the communication apparatus need not always include the imaging unit 102.

Connection Form

The connection form of the digital camera 100 and the FTP server 200 according to the present embodiment will be described next with reference to FIGS. 2A and 2B.

The digital camera 100 according to the present embodiment transmits/receives a file to/from the FTP server 200 in accordance with FTP.

Figure 2A:
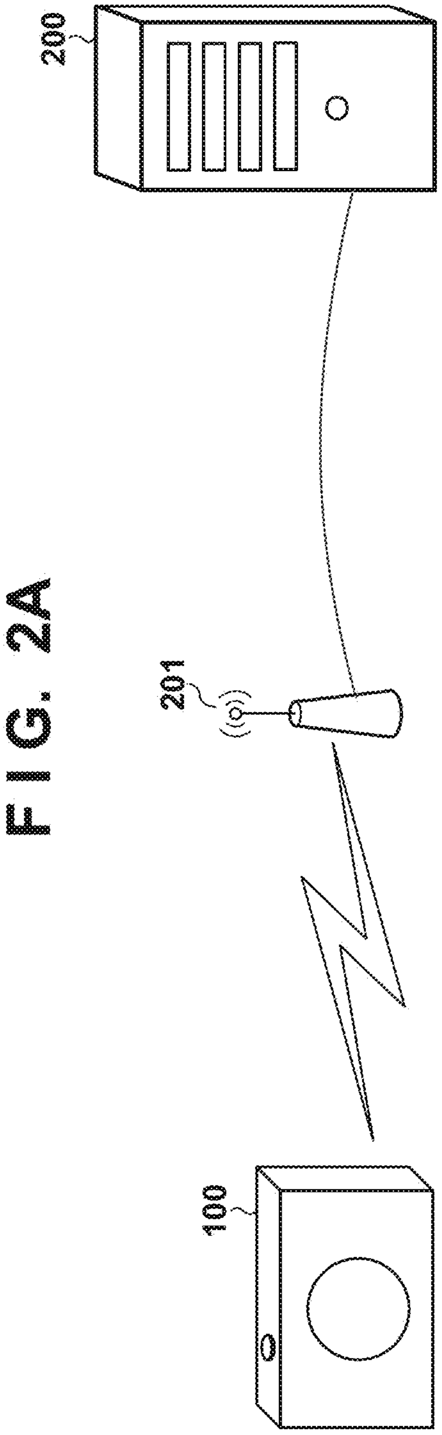
FIGS. 2A and 2B are views each illustrating a connection form of the digital camera and an FTP server according to the first embodiment.
Figure 2B:
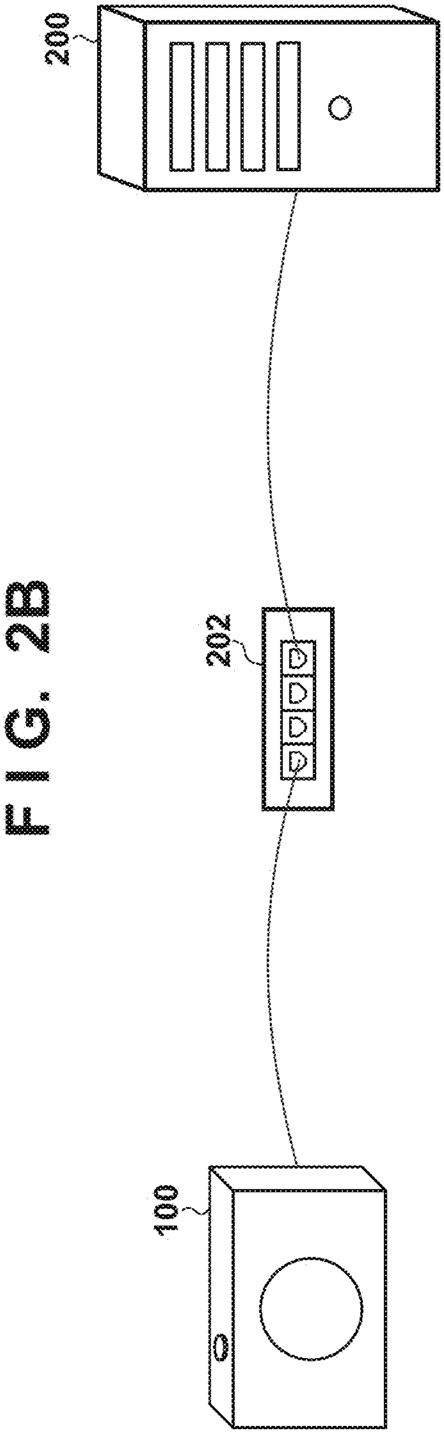

FIGS. 2A and 2B are views each illustrating the connection form of the digital camera 100 and the FTP server 200 according to the present embodiment. FIG. 2A illustrates the connection form of connecting the digital camera 100 and the FTP server 200 via an access point 201.

In an example shown in FIG. 2A, the digital camera 100 and the FTP server 200 join a wireless LAN network formed by the access point 201 as an example of an external relay apparatus, the digital camera 100 designates the FTP server 200 to be connected, and thus the digital camera 100 and the FTP server 200 can communicate with each other using FTP. FIG. 2B illustrates the connection form of connecting the digital camera 100 and the FTP server 200 via a hub 202.

In an example shown in FIG. 2B, the digital camera 100 and the wired LAN hub 202 as an example of an external relay apparatus are connected by a wired LAN cable, the digital camera 100 designates the FTP server 200 to be connected, and thus the digital camera 100 and the FTP server 200 can communicate with each other using FTP.

Note that the present embodiment will describe an example of connecting the digital camera 100 to the FTP server 200 but the present invention is not limited to this. Furthermore, the present embodiment will describe an example of connecting the digital camera 100 and the FTP server 200 by the wired LAN hub and the wired LAN cable but the present invention is not limited to this. For example, it is possible to perform connection to an AP by a wired LAN cable or to perform direct connection to the FTP server 200 by a wired LAN cable.

Session Establishment Processing

Processing of establishing a session between the digital camera 100 and the FTP server 200 will be described next.

First, the digital camera 100 transmits a connection request to the FTP server 200, and the FTP server 200 transmits a response to the connection request received from the digital camera 100.

Next, the digital camera 100 transmits a user name and a password to the FTP server 200. The FTP server 200 transmits a response to the user name and the password received from the digital camera 100.

As described above, the digital camera 100 exchanges data for logging in to the FTP server 200. If the digital camera 100 can log in, it is successfully connected to the FTP server 200, thereby establishing a session.

If a communication path between the digital camera 100 and the FTP server 200 is interrupted or the FTP server 200 is not activated, the digital camera 100 cannot receive a response to the connection request of the digital camera 100 from the FTP server 200, and it cannot thus be connected to the FTP server 200. If the digital camera 100 cannot receive a response within a predetermined time after transmitting the connection request to the FTP server 200, it determines that connection to the FTP server 200 has failed.

Furthermore, if the user name or the password used to log in is not correct, or if a communication error occurs and the FTP server 200 cannot correctly authenticate the user name and the password, the FTP server 200 transmits a login failure response to the digital camera 100. Upon receiving the login failure response from the FTP server 200, the digital camera 100 determines that connection to the FTP server 200 has failed.

If connection to the FTP server 200 has failed, the digital camera 100 performs reconnection processing. The reconnection processing may be performed after a predetermined standby time (for example, 10 sec) elapses since the digital camera 100 determines that connection to the FTP server 200 has failed. By using an exponential backoff algorithm, the standby time can be increased exponentially like 1 sec, 2 sec, 4 sec, and 8 sec in order from the first time every time the reconnection processing is performed. When performing the reconnection processing, if the interruption of the communication path is resolved, if the FTP server 200 is restarted, or if the FTP server 200 can correctly authenticate the user name and the password without any communication error, connection to the FTP server 200 succeeds.

If connection to the FTP server 200 fails even by the reconnection processing, the digital camera 100 performs the reconnection processing again. In the present embodiment, the total number of attempts of the first connection processing and the reconnection processing will be referred to as a connection attempt count hereinafter. For example, if the reconnection processing is performed three times after the first connection processing, the connection attempt count is four. A predetermined upper limit may be set for the connection attempt count. In the present embodiment, the upper limit of the connection attempt count will be referred to as a maximum connection attempt count hereinafter. While the connection processing continues to fail, the digital camera 100 repeatedly performs the reconnection processing until the maximum connection attempt count is reached. For example, if the maximum connection attempt count is 10, the reconnection processing is performed up to nine times after the first connection processing. If the reconnection processing is repeated in a state in which connection to the FTP server 200 is impossible, the communication band and the processing capabilities of the digital camera 100 that transmits a connection request and the FTP server 200 that transmits a response to the connection request are used. In the present embodiment, by setting the upper limit for the number of times of the reconnection processing, it is possible to reduce the use of the communication band and the processing capabilities of the digital camera 100 and the FTP server 200.

With the above-described processing, the digital camera 100 is connected to the FTP server 200. The digital camera 100 can simultaneously establish a plurality of sessions with the FTP server 200. The digital camera 100 performs connection processing of a plurality of sessions, thereby establishing the plurality of sessions with the FTP server 200. When the plurality of sessions with the FTP server 200 are established, the digital camera 100 can simultaneously transfer a plurality of image files to the FTP server 200 using the plurality of sessions.

Session Establishment Processing of First Embodiment

Processing in which the digital camera 100 establishes a session with the FTP server 200 that limits the number of sessions that can be connected simultaneously by the same user will be described next with reference to FIGS. 3 and 4A to 4F.

Figure 3:
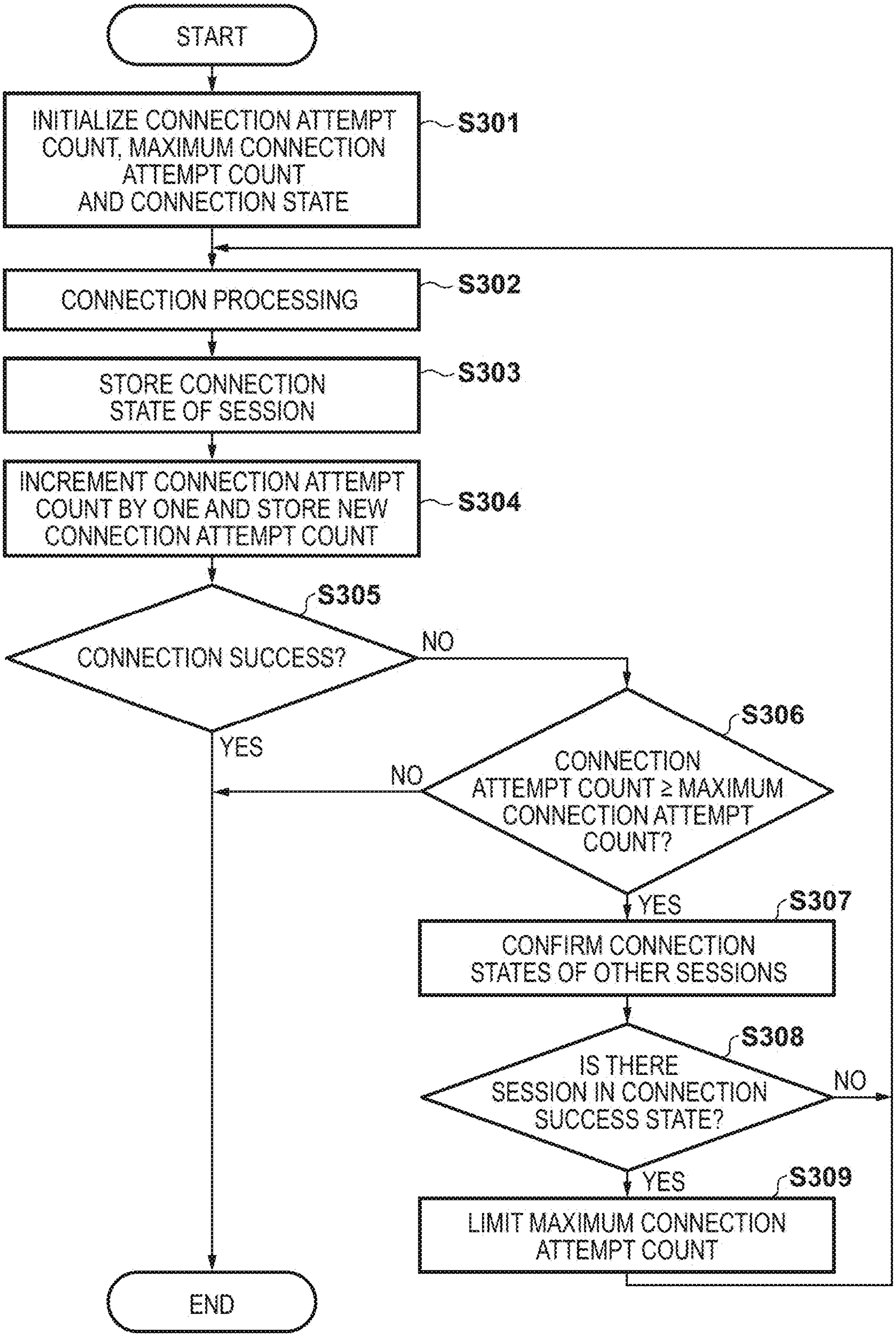
FIG. 3 is a flowchart illustrating session establishment processing with the FTP server by the digital camera according to the first embodiment.

FIG. 3 is a flowchart illustrating session establishment processing with the FTP server 200 by the digital camera 100 according to the first embodiment. FIGS. 4A to 4F each show an example of a UI screen displayed in the session establishment processing according to the first embodiment.

The processing shown in FIG. 3 is implemented when the control unit 101 deploys the program stored in the nonvolatile memory 103 to the working memory 104, executes it, and controls the respective components of the digital camera 100. The same applies to FIG. 5 to be described later.

Figure 4A:
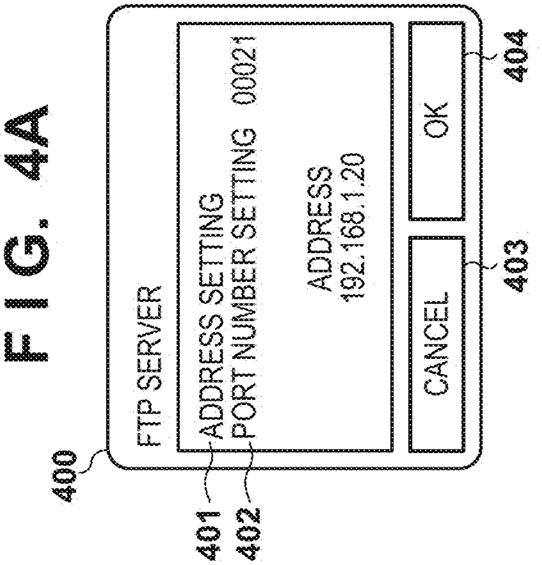
FIGS. 4A to 4F are views each illustrating an example of a UI screen displayed in the session establishment processing with the FTP server by the digital camera according to the first embodiment.

FIG. 4A illustrates a connection setting screen 400 for inputting setting items of the FTP server 200 to be connected. The control unit 101 displays the connection setting screen 400 on the display unit 106 when the user operates the operation unit 105. An input field 401 is a field to which the user inputs the IP address of the FTP server 200 to be connected. An input field 402 is a field to which the user inputs the port number of the FTP server 200 to be connected. A "cancel" button 403 is a button that is selected by the user to cancel the input of the settings and transition to the previous screen. An "OK" button 404 is a button that is selected by the user to confirm the input of the settings and transition to the next screen. The user operates the operation unit 105 to input, to the input fields 401 and 402, the IP address and the port number of the FTP server 200 to be connected, respectively. The control unit 101 stores, in the nonvolatile memory 103, the IP address and the port number of the FTP server 200 to be connected, which have been input by the user.

Figure 4B:
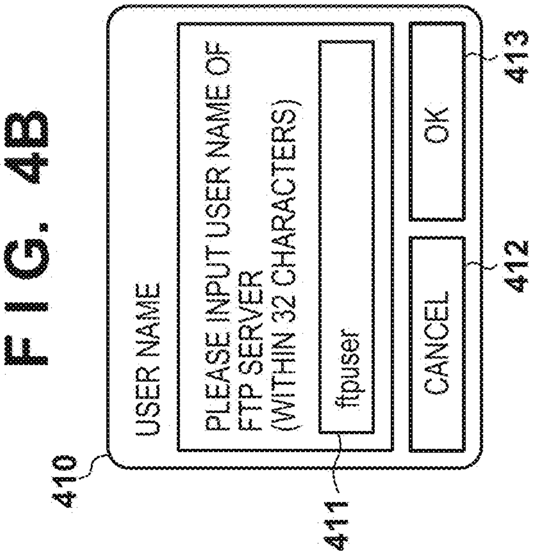

Next, when the user operates the operation unit 105 to select the "OK" button 404, the control unit 101 displays a user name setting screen 410 shown in FIG. 4B on the display unit 106 based on the user selection accepted via the operation unit 105. An input field 411 is a field to which the user inputs a user name to be used to log in to the FTP server 200 to be connected. A "cancel" button 412 is a button that is selected by the user to cancel the input of the setting and transition to the previous screen. An "OK" button 413 is a button that is selected by the user to confirm the input of the setting and transition to the next screen. The user operates the operation unit 105 to input, to the input field 411, the user name to be used to log in to the FTP server 200 to be connected. The control unit 101 stores, in the nonvolatile memory 103, the user name to be used to log in to the FTP server 200 to be connected, which has been input based on the user input.

Figure 4C:
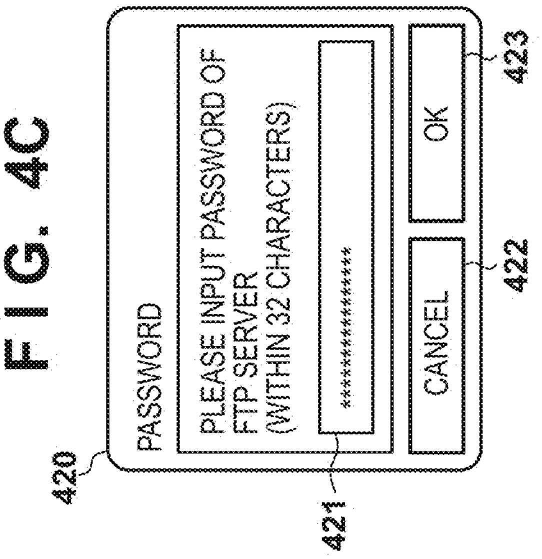

Next, when the user operates the operation unit 105 to select the "OK" button 413, the control unit 101 displays a password setting screen 420 shown in FIG. 4C on the display unit 106 based on the user selection accepted via the operation unit 105. An input field 421 is a field to which the user inputs a password to be used to log in to the FTP server 200 to be connected. A "cancel" button 422 is a button that is selected by the user to cancel the input of the setting and transition to the previous screen. An "OK" button 423 is a button that is selected by the user to confirm the input of the setting and transition to the next screen. The user operates the operation unit 105 to input, to the input field 421, the password to be used to log in to the FTP server 200 to be connected. The control unit 101 stores, in the nonvolatile memory 103, the password to be used to log in to the FTP server 200 to be connected, which has been input based on the user input.

Figure 4D:
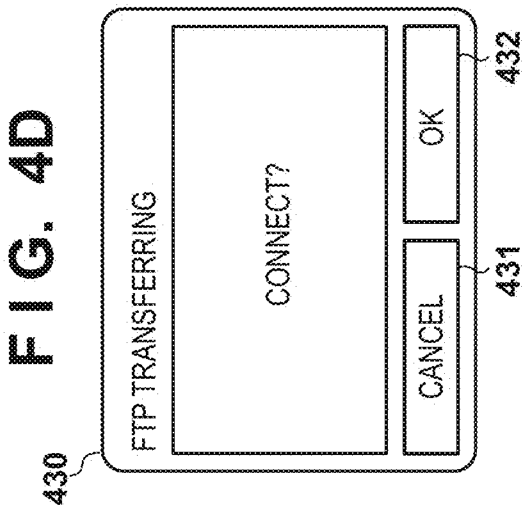

Next, when the user operates the operation unit 105 to select the "OK" button 423, the control unit 101 displays a connection confirmation screen 430 with the FTP server 200 shown in FIG. 4D on the display unit 106 based on the user selection accepted via the operation unit 105. A "cancel" button 431 is a button that is selected by the user to cancel the connection to the FTP server 200 and transition to the previous screen. An "OK" button 432 is a button that is selected by the user to start connection to the FTP server 200.

Next, when the user operates the operation unit 105 to select the "OK" button 432, the control unit 101 starts session establishment processing with the FTP server 200 for all sessions based on the user operation accepted via the operation unit 105.

In an operation example of the present embodiment, assume that the digital camera 100 establishes two sessions with the FTP server 200, and a user name and a password to be used to establish each session are stored in the nonvolatile memory 103. Assume also that the two sessions established between the digital camera 100 and the FTP server 200 are represented as session 1 and session 2, and the order of processing of establishing session 1 and session 2 is not limited. The initial value of the maximum connection attempt count of session 1 and session 2 is 10.

Operation Example 1

First, as operation example 1, a case where connection to the FTP server 200 succeeds with respect to both session 1 and session 2 will be described.

The control unit 101 performs processing in step S301 based on the user selection of the "OK" button 432 accepted via the operation unit 105.

In step S301, the control unit 101 initializes the connection attempt count of each session, the maximum connection attempt count, and a connection state. The connection state indicates the connection state of each session with the FTP server 200, and it includes an unconnected state in which connection processing in step S302 is not complete. The connection state also includes a connection success state in which the connection processing in step S302 is completed once or more and connection succeeds. The connection state includes a connection failure state in which the connection processing in step S302 is completed once or more and connection fails. The control unit 101 initializes the connection attempt count of each session to 0, the maximum connection attempt count to 10, and the connection state to the unconnected state, and stores them in the working memory 104.

In step S302, the control unit 101 performs the connection processing to the FTP server 200 with respect to each session via the communication unit 111. In the connection processing to the FTP server 200, the IP address and the port number of the FTP server 200, the user name, and the password stored in the nonvolatile memory 103 are used. The control unit 101 performs the connection processing to the FTP server 200 via the communication unit 111, and it determines whether the connection state of each session is the connection success state or the connection failure state. In this example, assume that both the connection states of session 1 and session 2 are the connection success state. Assume also that the connection processing in step S302 with respect to session 1 is complete before the connection processing in step S302 with respect to session 2.

In step S303, the control unit 101 stores, in the working memory 104, the connection state of the session determined in step S302. In this example, the connection success state is stored as the connection state of session 1 in the working memory 104.

In step S304, the control unit 101 increments the connection attempt count of the session by one. In this example, the connection attempt count of session 1 is set to 1. The control unit 101 stores the new connection attempt count of session 1 in the working memory 104.

In step S305, the control unit 101 determines whether the connection state of the session stored in the working memory 104 is the connection success state. Upon determining that the connection state is the connection success state, the control unit 101 ends the processing. Upon determining that the connection state is the connection failure state, the control unit 101 advances the processing to step S306. In this example, the control unit 101 determines that the connection state of session 1 is the connection success state, and it ends the connection processing with respect to session 1.

The processing of establishing session 1 has been explained above.

Upon completion of the connection processing in step S302 with respect to session 2, the control unit 101 advances to the processing in step S303 with respect to session 2.

In steps S303 to S305, the control unit 101 performs, for session 2, the same processing as those for session 1, and stores the connection success state as the connection state of session 2 in the working memory 104. Next, the control unit 101 stores 1 as the connection attempt count of session 2 in the working memory 104. The control unit 101 determines that the connection state of session 2 is the connection success state, and it ends the connection processing with respect to session 2.

The processing of establishing session 2 has been explained above.

Figure 4E:
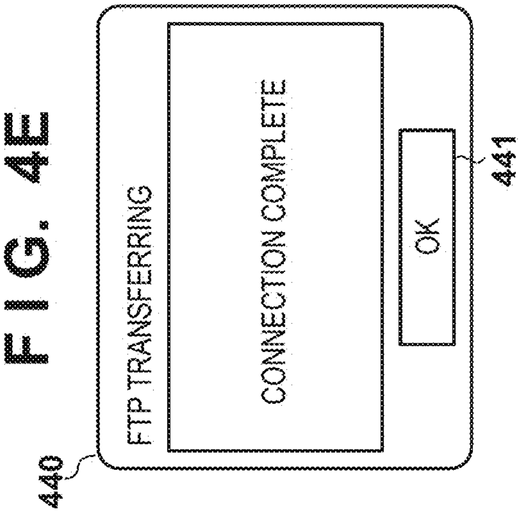

After the processing of establishing session 1 and session 2 ends according to the above-described procedure, if there is a session in the connection success state, the control unit 101 displays a connection completion notification screen 440 with the FTP server 200 shown in FIG. 4E on the display unit 106. On the connection completion notification screen 440, an "OK" button 441 used to transition to the next screen is displayed. By displaying the connection completion notification screen 440 on the display unit 106, the control unit 101 notifies the user that connection to the FTP server 200 is complete. When the user selects the "OK" button 441, the control unit 101 performs the next processing of the session establishment processing with the FTP server 200, for example, image transfer processing.

With the above-described session establishment processing with the FTP server 200, session 1 and session 2 are successfully connected to the FTP server 200, and it is possible to perform transfer processing using the two sessions. When image file transfer processing is performed based on a user operation, the control unit 101 can simultaneously transfer up to two image files using the two sessions.

Operation Example 2

Next, as operation example 2, a case where connection to the FTP server 200 fails with respect to both session 1 and session 2 will be described.

Processing in step S301 is the same as in operation example 1.

In step S302, the control unit 101 performs the connection processing to the FTP server 200 with respect to each session via the communication unit 111. Assume here that connection to the FTP server 200 fails with respect to session 1 and session 2. Assume also that the connection processing in step S302 with respect to session 1 is complete before the connection processing in step S302 with respect to session 2.

In step S303, the control unit 101 stores the connection failure state as the connection state of session 1 in the working memory 104.

In step S304, the control unit 101 stores 1 as the connection attempt count of session 1 in the working memory 104.

In step S305, the control unit 101 determines that the connection state of session 1 is the connection failure state and advances the processing to step S306.

In step S306, the control unit 101 compares the connection attempt count of the session with the maximum connection attempt count, and it determines whether the connection attempt count is smaller than the maximum connection attempt count. Upon determining that the connection attempt count is smaller than the maximum connection attempt count, the control unit 101 advances the processing to step S307. Upon determining that the connection attempt count is equal to or larger than the maximum connection attempt count, the control unit 101 ends the processing. In this example, the control unit 101 determines that the connection attempt count of session 1 is smaller than the maximum connection attempt count and advances the processing to step S307. When it is determined in the determination processing in step S306 that the connection attempt count of the session is equal to or larger than the maximum connection attempt count, the control unit 101 controls not to perform the reconnection processing any more.

In step S307, the control unit 101 confirms the connection states of all sessions other than the session for which the connection processing is currently performed. In this example, the control unit 101 confirms the connection state of session 2 other than session 1. In this case, session 2 is in the unconnected state in which the connection processing in step S302 is not complete.

In step S308, the control unit 101 determines whether there is a session in the connection success state among all the sessions confirmed in step S307. Upon determining that there is a session in the connection success state, the control unit 101 advances the processing to step S309. Upon determining that there is no session in the connection success state, the control unit 101 returns the processing to step S302. In this example, the control unit 101 determines that there is no session in the connection success state, returns the processing to step S302, and performs the connection processing again with respect to session 1.

When the connection processing in step S302 with respect to session 2 is complete, the control unit 101 advances to the processing in step S303 with respect to session 2.

In steps S303 to S308, the control unit 101 performs, for session 2, the same processing as those for session 1, returns the processing to step S302 with respect to session 2, similar to session 1, and performs the connection processing again.

If connection to the FTP server 200 fails with respect to both session 1 and session 2 according to the above-described procedure, the connection processing in step S302 is repeatedly performed while the connection attempt count of each session is smaller than the maximum connection attempt count, and when the connection attempt count reaches the maximum connection attempt count, the connection processing is not performed any more. In this example, the control unit 101 performs the connection processing in step S302 with respect to each session up to 10 times given as the maximum connection attempt count.

Figure 4F:
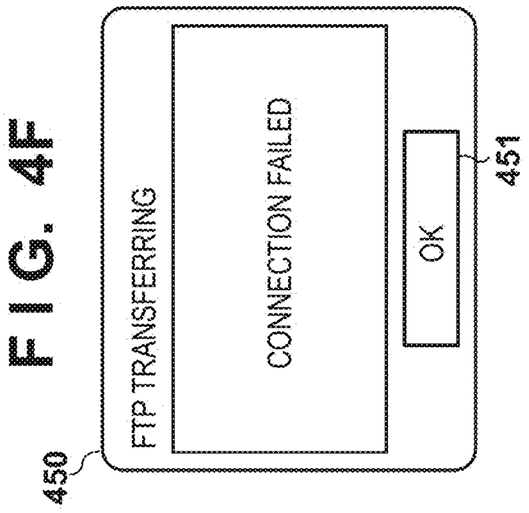

After the processing of establishing session 1 and session 2 ends according to the above-described procedure, when there is no session in the connection success state, the control unit 101 displays a connection failure notification screen 450 with the FTP server 200 shown in FIG. 4F on the display unit 106. On the connection failure notification screen 450, an "OK" button 451 used to transition to the next screen is displayed. By displaying the connection failure notification screen 450 on the display unit 106, the control unit 101 notifies the user that connection to the FTP server 200 has failed. When the user selects the "OK" button 451, the control unit 101 performs the next processing of the session establishment processing with the FTP server 200.

Operation Example 3

Next, as operation example 3, processing in which the digital camera 100 is connected to the FTP server 200 in a case where the FTP server 200 limits, to one, the number of sessions that can be connected simultaneously by the same user will be described next.

Assume that the FTP server 200 determines, based on a user name, whether a connection request is sent from the same user. When the digital camera 100 performs connection to exceed the number of sessions limited by the FTP server 200, it cannot log in to the FTP server 200 and fails to be connected. Assume here that connection of session 1 succeeds and connection of session 2 fails due to the limitation by the FTP server 200.

Processing in step S301 is the same as in operation example 1.

In step S302, the control unit 101 performs the connection processing to the FTP server 200 with respect to each session. Assume here that session 1 is successfully connected and session 2 fails to be connected. Assume also that the connection processing in step S302 with respect to session 1 is complete before the connection processing in step S302 with respect to session 2.

Processes from step S303 with respect to session 1 are the same as those from step S303 with respect to session 1 in operation example 1. First, the control unit 101 stores the connection success state as the connection state of session 1 in the working memory 104. Next, the control unit 101 stores 1 as the connection attempt count of session 1 in the working memory 104. Next, the control unit 101 determines that the connection state of session 1 is the connection success state, and it ends the processing of establishing session 1.

When the connection processing in step S302 with respect to session 2 is complete, the control unit 101 advances to the processing in step S303 with respect to session 2.

Processes in steps S303 to S306 with respect to session 2 are the same as those in steps S303 to S306 with respect to session 2 in operation example 2. The control unit 101 stores the connection failure state as the connection state of session 2 in the working memory 104, and stores 1 as the connection attempt count of session 2 in the working memory 104. The control unit 101 determines that the connection state of session 2 is the connection failure state, determines that the connection attempt count of session 2 is smaller than the maximum connection attempt count, and advances the processing to step S307.

In step S307, the control unit 101 confirms the connection state of session 1 other than session 2. In this case, session 1 is in the connection success state.

In step S308, the control unit 101 determines that there is a session in the connection success state and advances the processing to step S309.

In step S309, the control unit 101 limits the maximum connection attempt count of the session and returns the processing to step S302. With the above processing, when performing the processing in step S309, the session for which the connection processing is currently performed, that is, session 2 fails to be connected, as determined in step S305, and the session other than the session for which the connection processing is currently performed, that is, session 1 is successfully connected, as determined in step S308. Therefore, at least one or more sessions are successfully connected, and at least one or more sessions fail to be connected. In general, when the digital camera 100, the FTP server 200, and the communication path normally operate and the FTP server 200 does not limit the number of sessions that can be connected simultaneously by the same user, all the sessions are successfully connected. To the contrary, if a problem has occurred in any of the digital camera 100, the FTP server 200, and the communication path, it is considered that all the sessions fail to be connected. Therefore, when at least one or more sessions are successfully connected and at least one or more sessions fail to be connected, it is assumed that the FTP server 200 limits the number of sessions that can be connected simultaneously by the same user. If connection fails due to the limitation on the number of sessions, even when the reconnection processing is repeatedly performed up to the maximum connection attempt count, connection continues to fail unless the limitation by the FTP server 200 is changed. Therefore, by limiting the maximum connection attempt count and making it smaller than the original maximum connection attempt count, it is possible to reduce the number of times of unnecessary reconnection processing. Assume here that the number of times obtained by adding 1 to the current connection attempt count of the session is set as the new maximum connection attempt count. Since the current connection attempt count of the session is smaller than the maximum connection attempt count, as determined in step S306, the number of times obtained by adding 1 to the current connection attempt count is always equal to or smaller than the maximum connection attempt count. In the present embodiment, the control unit 101 sets, as the new maximum connection attempt count of session 2, 2 obtained by adding 1 to 1 as the current connection attempt count of session 2. This limits the maximum connection attempt count of session 2 from 10 to 2.

In step S302, the control unit 101 performs the connection processing again with respect to session 2, and connection fails again due to the limitation by the FTP server 200.

The processing in steps S303 to S305 with respect to session 2 are the same as those in steps S303 to S305 performed for the first time with respect to session 2 in operation example 3. The control unit 101 stores the connection failure state as the connection state of session 2 in the working memory 104. Next, the control unit 101 stores 2 as the connection attempt count of session 2 in the working memory 104. Next, the control unit 101 determines the connection failure state as the connection state of session 2 and advances the processing to step S306.

In step S306, the control unit 101 compares the connection attempt count of session 2 with the maximum connection attempt count. In this case, since the connection attempt count of session 2 is 2 and the maximum connection attempt count is 2, the control unit 101 determines that the connection attempt count is equal to or larger than the maximum connection attempt count and ends the processing of establishing session 2.

In the above-described connection processing with respect to session 2, when the maximum connection attempt count is not limited in step S309, the connection processing with respect to session 2 is performed 10 times given as the original maximum connection attempt count. To the contrary, when the maximum connection attempt count is limited in step S309, the connection processing with respect to session 2 is performed twice and ends, and it is thus possible to reduce unnecessary connection processing.

The maximum connection attempt count limited in step S309 may be set to zero, and an image file may be transferred using the session that has successfully been connected, without performing the reconnection processing with respect to the session that has failed to be connected.

After the processing of establishing session 1 and session 2 ends according to the above-described procedure, when there is a session in the connection success state, the control unit 101 displays the connection completion notification screen 440 with the FTP server 200 shown in FIG. 4E on the display unit 106. On the connection completion notification screen 440, information representing that connection of some sessions has succeeded and connection of some sessions has failed may be displayed to notify the user of it.

With the above-described procedure, connection of session 1 to the FTP server 200 has succeeded and connection of session 2 to the FTP server 200 has failed, thereby allowing data transfer using one session. When the control unit 101 performs image transfer based on a user operation, it transfers an image file using the session in the connection success state.

Second Embodiment

Session establishment processing according to the second embodiment will be described next.

The configuration and function of a digital camera 100 according to the second embodiment are the same as in the first embodiment.

If the digital camera 100 fails to be connected to an FTP server 200, it performs reconnection processing. If connection to the FTP server 200 fails even by the reconnection processing, the digital camera 100 performs the reconnection processing again. In the present embodiment, an elapsed time after the start of the first connection processing will be referred to as a connection attempt time hereinafter. A predetermined upper limit may be set for the connection attempt time. The upper limit of the connection attempt time will be referred to as a maximum connection attempt time hereinafter. While the connection processing continues to fail, the digital camera 100 repeatedly performs the reconnection processing until the connection attempt time reaches the maximum connection attempt time. By setting the upper limit for a period during which the reconnection processing is performed, it is possible to reduce the use of the communication band and the processing capabilities of the digital camera 100 and the FTP server 200 associated with the reconnection processing.

A method in which the digital camera 100 is connected to the FTP server 200 that limits the number of sessions that can be connected simultaneously by the same user will be described next with reference to FIGS. 4A to 4F and 5.

Figure 5:
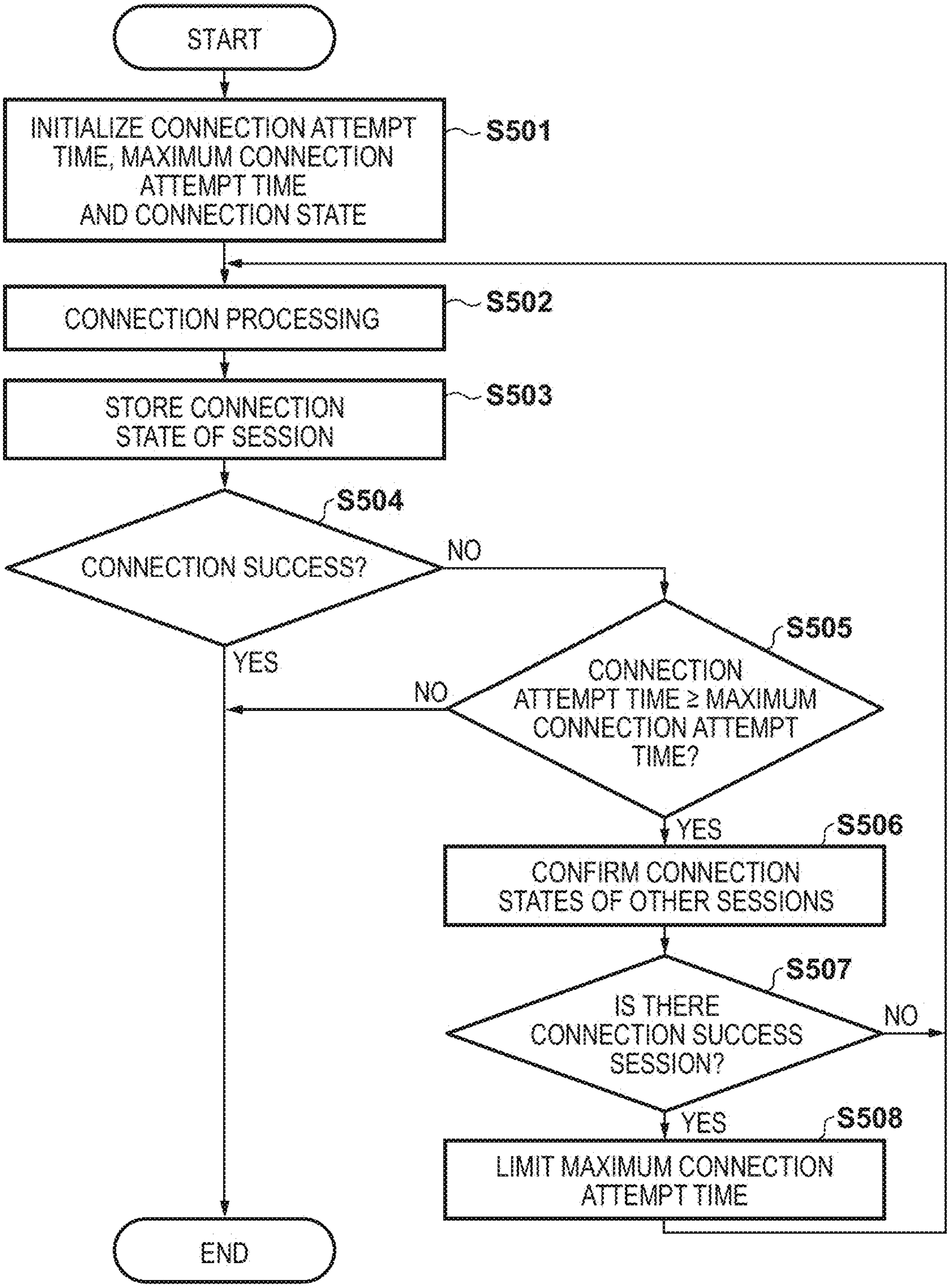
FIG. 5 is a flowchart illustrating session establishment processing with an FTP server by a digital camera according to a second embodiment.

FIG. 5 is a flowchart illustrating session establishment processing according to the second embodiment.

When the user operates an operation unit 105 to select an “OK” button 432, a control unit 101 starts connection processing to the FTP server 200 with respect to each session based on the user operation accepted via the operation unit 105.

In the second embodiment, assume that the digital camera 100 establishes two sessions with the FTP server 200 and a user name and a password to be used to establish each session are stored in a nonvolatile memory 103. Assume also that the two sessions established between the digital camera 100 and the FTP server 200 are represented as session 1 and session 2, and the order of processing of establishing session 1 and session 2 is not limited. The initial value of the maximum connection attempt time of session 1 and session 2 is 100 sec.

In an operation example of the second embodiment, processing in which the digital camera 100 is connected to the FTP server 200 in a case where the FTP server 200 limits, to 1, the number of sessions that can be connected simultaneously by the same user will be described.

Assume that the FTP server 200 determines, based on a user name, whether a connection request is sent from the same user. When the digital camera 100 performs connection to exceed the number of sessions limited by the FTP server 200, it cannot log in to the FTP server 200 and fails to be connected. Assume here that connection of session 1 succeeds and connection of session 2 fails due to the limitation by the FTP server 200.

The control unit 101 performs processing in step S501 based on the user selection of the "OK" button 432 accepted via the operation unit 105.

In step S501, the control unit 101 initializes the connection attempt time of each session, the maximum connection attempt time, and a connection state. The control unit 101 initializes the connection attempt time of each session to 0, the maximum connection attempt time to 100 sec, and the connection state to an unconnected state, and stores them in a working memory 104. The control unit 101 starts to measure the time simultaneously with the setting of the connection attempt time of each session to 0 sec, and stores, in the working memory 104, an elapsed time after the start of the connection processing as the connection attempt time.

Processing in step S502 is the same as that in step S302 of FIG. 3. In this example, connection of session 1 succeeds and connection of session 2 fails. Assume that the connection processing in step S502 with respect to session 1 is complete before the connection processing in step S502 with respect to session 2.

Processing in step S503 is the same as that in step S303 of FIG. 3. In this example, the control unit 101 stores a connection success state as the connection state of session 1 in the working memory 104.

Processing in step S504 is the same as that in step S305 of FIG. 3. Upon determining that the connection state of the session is the connection success state, the control unit 101 ends the processing. Upon determining that the connection state is a connection failure state, the control unit 101 advances the processing to step S505. In this example, the control unit 101 determines that the connection state of session 1 is the connection success state and ends the processing of establishing session 1.

The processing of establishing session 1 has been explained above.

Upon completion of the connection processing in step S502 with respect to session 2, the control unit 101 advances to the processing in step S503 with respect to session 2.

In steps S503 and S504, the control unit 101 performs, for session 2, the same processing as those for session 1. The control unit 101 stores the connection failure state as the connection state of session 2 in the working memory 104. Next, the control unit 101 determines that the connection state of session 2 is the connection failure state and advances the processing to step S505.

In step S505, the control unit 101 compares the connection attempt time of the session with the maximum connection attempt time, and it determines whether the connection attempt time is shorter than the maximum connection attempt time. Upon determining that the connection attempt time is shorter than the maximum connection attempt time, the control unit 101 advances the processing to step S506. Upon determining that the connection attempt time is equal to or longer than the maximum connection attempt time, the control unit 101 ends the processing. In this example, assume that the connection attempt time of session 2 is 30 sec. In this case, the control unit 101 determines that the connection attempt time of session 2 is shorter than the maximum connection attempt time and advances the processing to step S506. When it is determined in the processing in step S505 that the connection attempt time of the session is equal to or longer than the maximum connection attempt time, it is controlled not to perform the reconnection processing any more.

Processing in step S506 is the same as that in step S307. The control unit 101 confirms the connection state of session 1 as a session other than session 2. In this case, session 1 is in the connection success state.

Processing in step S507 is the same as that in step S308. The control unit 101 determines that there is a session in the connection success state and advances the processing to step S508.

In step S508, the control unit 101 limits the maximum connection attempt time of the session. In this example, 50 sec is set as the new maximum connection attempt time. This limits the maximum connection attempt time of session 2 from 100 sec to 50 sec. The connection processing in step S502 is performed again after step S508.

In step S502, the control unit 101 performs the connection processing again with respect to session 2, and connection fails again due to the limitation by the FTP server 200.

The processing in steps S503 and S504 with respect to session 2 are the same as those in steps S503 and S504 performed for the first time with respect to session 2. In this example, the control unit 101 stores the connection failure state as the connection state of session 2 in the working memory 104. Next, the control unit 101 determines that the connection state of session 2 is the connection failure state and advances the processing to step S505.

In step S505, the control unit 101 compares the connection attempt time of session 2 with the maximum connection attempt time. Assume here that the connection attempt time of session 2 is 60 sec. In this case, since the connection attempt time of session 2 is 60 sec and the maximum connection attempt time is 50 sec, the control unit 101 determines that the connection attempt time is equal to or longer than the maximum connection attempt time and ends the connection processing with respect to session 2.

In the connection processing with respect to session 2, in a case where the time taken to perform the connection processing once is 30 sec, when the maximum connection attempt time is not limited in step S508, the connection processing with respect to session 2 is performed four times. When the maximum connection attempt time is limited in step S508, the connection processing with respect to session 2 is performed twice and ends, and it is thus possible to reduce unnecessary connection processing.

The maximum connection attempt time limited in step S508 may be set to zero, and an image file may be transferred using the session that has successfully been connected, without performing the reconnection processing with respect to the session that has failed to be connected.

After the connection processing with respect to session 1 and session 2 ends according to the above-described procedure, when there is a session in the connection success state, the control unit 101 displays a connection completion notification screen 440 with the FTP server 200 shown in FIG. 4E on a display unit 106.

As described above, when the digital camera 100 is connected to the FTP server that limits the number of sessions that can be connected simultaneously by the same user, it can perform connection by reducing unnecessary reconnection processing. When connection of a given session has failed and when connection of another session has succeeded, the digital camera 100 performs the connection processing (step S302) again by limiting the maximum connection attempt count. Alternatively, when connection of a given session has failed and when connection of another session has succeeded, the digital camera 100 performs the connection processing (step S502) again by limiting the maximum connection attempt time. This can reduce the processing loads of the digital camera 100 and the FTP server 200 and reduce the use of the communication band between the digital camera 100 and the FTP server 200.

Note that each of the above-described embodiments has explained an example in which the digital camera 100 establishes two sessions with the FTP server 200. However, even when the digital camera 100 is connected to the FTP server 200 by an arbitrary number of sessions equal to or larger than two, the same connection processing to the FTP server 200 as in the present embodiment is applicable.

Each of the above-described embodiments has explained an example of shifting to the next processing, for example, image transfer processing after the end of the connection processing with respect to all sessions. However, when connection succeeds by connection processing with respect to a given session, the processing may shift to the next processing, for example, image transfer processing using the session that has successfully been connected without waiting for the end of connection processing with respect to another session.

Each of the above-described embodiments has explained an example in which the FTP server 200 limits, to one, the number of sessions that can be connected simultaneously by the same user. However, even when the FTP server 200 limits, to an arbitrary number of sessions equal to or larger than one, the number of sessions that can be connected simultaneously by the same user, the digital camera 100 can apply the same connection processing to the FTP server 200 as in the present embodiment.

In each of the above-described embodiments, it is considered that after the end of the session establishment processing with the FTP server 200, the limitation, by the FTP server 200, on the number of sessions that can be connected simultaneously by the same user is changed to allow connection of the session that has failed to be connected. In this case, after performing predetermined processing after the end of the session establishment processing with the FTP server 200, the control unit 101 may perform connection processing with respect to the session that has failed to be connected. "After performing predetermined processing" indicates, for example, "after performing transfer processing of one file" or "after transferring a series of files selected by a user operation".

Each of the above-described embodiments has explained an example in which the FTP server 200 limits the number of sessions that can be connected simultaneously by the same user by determining a user name of a connection request. However, by using other information for identifying the digital camera 100, for example, the IP address or the MAC address of the digital camera 100, the FTP server 200 may limit the number of sessions that are connected simultaneously.

Each of the above-described embodiments has explained an example in which the FTP server 200 limits the number of sessions that can be connected simultaneously by the same user. However, the FTP server 200 may limit the total number of sessions of all users to be connected to the FTP server 200.

Each of the above-described embodiments has explained an example in which the FTP server 200 limits the number of sessions but a firewall installed in the communication path between the digital camera 100 and the FTP server 200 may limit the number of sessions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-009598, filed Jan. 25, 2024 which is hereby incorporated by reference herein in its entirety.

What is claimed is:

1. A communication apparatus comprising:

a communication unit that is able to communicate with an external apparatus; and a control unit that performs connection processing for establishing a plurality of sessions with the external apparatus, and performs reconnection processing of a session that has failed to be connected, wherein the control unit sets a frequency of performing the reconnection processing in a case where there is a session that has failed to be connected among the plurality of sessions to be lower than a frequency of performing the reconnection processing in a case where there is no session that has successfully been connected among the plurality of sessions.

2. The apparatus according to claim 1, wherein the frequency is an upper limit of the number of times the reconnection processing is performed.

3. The apparatus according to claim 2, wherein in a case where there is a session that has successfully been connected among the plurality of sessions, the control unit limits, to be less than a predetermined number of times, the number of times the reconnection processing of the session that has failed to be connected is performed, and in a case where there is no session that has successfully been connected among the plurality of sessions, the control unit does not limit the number of times to be less than the predetermined number of times.

4. The apparatus according to claim 2, wherein in a case where there is a session that has successfully been connected among the plurality of sessions, the control unit sets, to zero, the number of times the reconnection processing of the session that has failed to be connected is performed, and in a case where there is no session that has successfully been connected among the plurality of sessions, the control unit sets, to be less than a predetermined number of times, the number of times the reconnection processing of the session that has failed to be connected is performed.

5. The apparatus according to claim 2, wherein after performing the connection processing for establishing the plurality of sessions with the external apparatus, and executing the reconnection processing of the session that has failed to be connected up to a predetermined number of times, the control unit starts transfer processing to the external apparatus.

6. The apparatus according to claim 5, wherein after performing the connection processing for establishing the plurality of sessions with the external apparatus, and executing the reconnection processing of the session that has failed to be connected up to the predetermined number of times, in a case where there is the session that has failed to be connected, the control unit performs the reconnection processing of the session that has failed to be connected after performing predetermined processing.

7. The apparatus according to claim 1, wherein the frequency is a time during which the reconnection processing of the session that has failed to be connected is repeatedly performed after a start of the connection processing.

8. The apparatus according to claim 7, wherein in a case where there is a session that has successfully been connected among the plurality of sessions, the control unit limits, to be less than a predetermined time, the time during which the reconnection processing of the session that has failed to be connected is repeatedly performed, and in a case where there is no session that has successfully been connected among the plurality of sessions, the control unit does not limit the time to be less than the predetermined time.

9. The apparatus according to claim 7, wherein in a case where there is a session that has successfully been connected among the plurality of sessions, the control unit sets, to zero, the time during which the reconnection processing of the session that has failed to be connected is repeatedly performed, and in a case where there is no session that has successfully been connected among the plurality of sessions, the control unit sets, to a predetermined time, the time during which the reconnection processing of the session that has failed to be connected is repeatedly performed.

10. The apparatus according to claim 7, wherein after performing the connection processing for establishing the plurality of sessions with the external apparatus, and executing the reconnection processing of the session that has failed to be connected by using a predetermined time as an upper limit, the control unit starts transfer processing to the external apparatus.

11. The apparatus according to claim 10, wherein after performing the connection processing for establishing the plurality of sessions with the external apparatus, and executing the reconnection processing of the session that has failed to be connected by using a predetermined time as an upper limit, in a case where there is the session that has failed to be connected, the control unit performs the reconnection processing of the session that has failed to be connected after performing predetermined processing.

12. A control method of a communication apparatus that is able to communicate with an external apparatus, comprising:

performing connection processing for establishing a plurality of sessions with the external apparatus; and performing reconnection processing of a session that has failed to be connected, wherein a frequency of performing the reconnection processing in a case where there is a session that has failed to be connected among the plurality of sessions is set lower than a frequency of performing the reconnection processing in a case where there is no session that has successfully been connected among the plurality of sessions.

13. A non-transitory computer-readable storage medium storing a program for causing a computer to function as a communication apparatus comprising:

a communication unit that is able to communicate with an external apparatus; and a control unit that performs connection processing for establishing a plurality of sessions with the external apparatus, and performs reconnection processing of a session that has failed to be connected, wherein the control unit sets a frequency of performing the reconnection processing in a case where there is a session that has failed to be connected among the plurality of sessions to be lower than a frequency of performing the reconnection processing in a case where there is no session that has successfully been connected among the plurality of sessions.

* * * * *